(12) United States Patent
McKinley et al.

(10) Patent No.: US 9,105,180 B2
(45) Date of Patent: Aug. 11, 2015

(54) TOUCH-SENSITIVE WIRELESS DEVICE AND ON SCREEN DISPLAY FOR REMOTELY CONTROLLING A SYSTEM

(75) Inventors: David McKinley, Dartmouth, MA (US); Chris Perry, Cummaquid, MA (US)

(73) Assignee: Savant Systems, LLC, Hyannis, MA (US)

( * ) Notice: Subject to any disclaimer, the term of this patent is extended or adjusted under 35 U.S.C. 154(b) by 500 days.

(21) Appl. No.: 12/921,710

(22) PCT Filed: Sep. 4, 2009

(86) PCT No.: PCT/US2009/005001
§ 371 (c)(1),
(2), (4) Date: Sep. 9, 2010

(87) PCT Pub. No.: WO2010/027492
PCT Pub. Date: Mar. 11, 2010

(65) Prior Publication Data
US 2011/0007018 A1    Jan. 13, 2011

Related U.S. Application Data

(60) Provisional application No. 61/094,099, filed on Sep. 4, 2008.

(51) Int. Cl.
*G06F 3/041* (2006.01)
*G06F 3/045* (2006.01)
(Continued)

(52) U.S. Cl.
CPC ............. *G08C 17/02* (2013.01); *G06F 3/0488* (2013.01); *G08C 23/04* (2013.01); *H04N 5/4403* (2013.01); *H04N 21/4222* (2013.01); *H04N 21/42222* (2013.01); *H04N 21/42224* (2013.01); *G08C 2201/21* (2013.01); *G08C 2201/30* (2013.01);
(Continued)

(58) Field of Classification Search
None
See application file for complete search history.

(56) References Cited

U.S. PATENT DOCUMENTS 4,281,330 A    7/1981    Warrick
5,205,758 A    4/1993    Comerci et al.
(Continued)

FOREIGN PATENT DOCUMENTS

CN    1503934 A    6/2004
EP    1 355 451 A2    10/2003
(Continued)

OTHER PUBLICATIONS

International Search Report for International Application No. PCT/US2009/005001 for Savant Systems, LLC, International Filing Date Apr. 9, 2009, Date of Mailing Mar. 18, 2010, 15 pages.
(Continued)

*Primary Examiner* — Alexander Eisen
*Assistant Examiner* — Nan-Ying Yang
(74) *Attorney, Agent, or Firm* — Cesari and McKenna, LLP

(57) ABSTRACT

A touch-sensitive wireless device, such as a wireless telephone or wireless multimedia player, in conjunction with an interactive on screen display, effectively remotely controls a programmable multimedia controller or other system. User gestures, button presses or other touches to or movements of the touch-sensitive wireless device are effectively converted to information that is wirelessly transmitted to the programmable multimedia controller. Once received by the programmable multimedia controller, such information is processed and effectively translated so as to control the operation of the controller.

22 Claims, 6 Drawing Sheets

(51) Int. Cl.

| | |
|---|---|
| *H04N 5/445* | (2011.01) |
| *G06F 3/00* | (2006.01) |
| *G06F 13/00* | (2006.01) |
| *H04N 7/16* | (2011.01) |
| *G08C 17/02* | (2006.01) |
| *G06F 3/0488* | (2013.01) |
| *G08C 23/04* | (2006.01) |
| *H04N 5/44* | (2011.01) |
| *H04N 21/422* | (2011.01) |

(52) U.S. Cl.
CPC ...... *G08C 2201/93* (2013.01); *H04N 2005/443* (2013.01); *H04N 2005/4425* (2013.01); *H04N 2005/4428* (2013.01)

(56) References Cited

U.S. PATENT DOCUMENTS

| | | | |
|---|---|---|---|
| 5,745,710 | A | 4/1998 | Clanton, III |
| 5,767,897 | A | 6/1998 | Howell |
| 6,396,523 | B1 | 5/2002 | Segal et al. |
| 6,538,643 | B2 | 3/2003 | Mori et al. |
| 6,765,557 | B1 | 7/2004 | Segal et al. |
| 7,495,659 | B2 | 2/2009 | Marriott et al. |
| 7,558,836 | B2 | 7/2009 | Suzuki |
| 2001/0035860 | A1* | 11/2001 | Segal et al. ............. 345/173 |
| 2003/0011640 | A1* | 1/2003 | Green et al. ............. 345/810 |
| 2003/0103088 | A1 | 6/2003 | Dresti et al. |
| 2003/0122866 | A1 | 7/2003 | Yook |
| 2004/0218104 | A1 | 11/2004 | Smith et al. |
| 2004/0249925 | A1 | 12/2004 | Jeon et al. |
| 2005/0159823 | A1* | 7/2005 | Hayes et al. ............. 700/19 |
| 2005/0212760 | A1 | 9/2005 | Marvit et al. |
| 2005/0253806 | A1* | 11/2005 | Liberty et al. ............. 345/156 |
| 2006/0132460 | A1* | 6/2006 | Kolmykov-Zotov et al. . 345/173 |
| 2007/0052675 | A1 | 3/2007 | Chang |
| 2007/0080845 | A1* | 4/2007 | Amand ............. 341/176 |
| 2007/0142022 | A1 | 6/2007 | Madonna |
| 2007/0143701 | A1 | 6/2007 | Iremonger et al. |
| 2007/0143801 | A1 | 6/2007 | Madonna et al. |
| 2007/0206827 | A1 | 9/2007 | Tupman et al. |
| 2007/0229465 | A1 | 10/2007 | Sakai et al. |
| 2007/0248261 | A1* | 10/2007 | Zhou et al. ............. 382/154 |
| 2008/0079604 | A1 | 4/2008 | Madonna et al. |
| 2008/0196068 | A1 | 8/2008 | Tseng |
| 2008/0287189 | A1* | 11/2008 | Rabin ............. 463/36 |
| 2009/0125842 | A1 | 5/2009 | Nakayama |
| 2009/0172596 | A1 | 7/2009 | Yamashita |
| 2009/0204929 | A1* | 8/2009 | Baurmann et al. ............. 715/836 |
| 2009/0239587 | A1* | 9/2009 | Negron et al. ............. 455/566 |
| 2009/0298535 | A1* | 12/2009 | Klein et al. ............. 455/556.1 |
| 2010/0241254 | A1 | 9/2010 | McKinley et al. |

FOREIGN PATENT DOCUMENTS

| | | |
|---|---|---|
| JP | 2001-67163 | 3/2001 |
| JP | 2002-207567 | 7/2002 |
| JP | 2006-033645 A | 2/2006 |
| JP | 2006-345537 | 12/2006 |
| JP | 2007-73047 A | 3/2007 |
| JP | 2008-177939 | 7/2008 |
| WO | WO 00/49731 | 8/2000 |
| WO | WO-01/08152 A1 | 2/2001 |
| WO | WO-01/78054 A1 | 10/2001 |
| WO | WO 02/075517 | 9/2002 |
| WO | WO-2006/055484 A1 | 5/2006 |
| WO | WO-2007/075816 A2 | 7/2007 |
| WO | WO 2008/033414 | 3/2008 |

OTHER PUBLICATIONS

Tonomura Y et al., "Content Oriented Visual Interface Using Video Icons for Visual Database Systems," Journal of Visual Languages and Computing, London, GB, vol. 1, Jan. 1, 1990, pp. 193-198.

U.S. International Search Report mail date Apr. 8, 2009 for International Application No. PCT/US2009/002690, filed Jan. 5, 2009, 18 pages.

"Notification of Transmittal of the International Search Report and the Written Opinion of the International Searching Authority, or the Declaration," International Filing Date: Sep. 4, 2008, International Application No. PCT/US2008/010376, Applicant: Savant Systems LLC, Inc., Date of Mailing: Apr. 14, 2009, pp. 1-12.

* cited by examiner

TOUCH-SENSITIVE WIRELESS DEVICE AND ON SCREEN DISPLAY FOR REMOTELY CONTROLLING A SYSTEM

CROSS REFERENCE TO RELATED APPLICATIONS

This application is a U.S. National Phase application of international application PCT No. PCT/US2009/005001, of David McKinley, et al., filed on Sep. 4, 2009, entitled TOUCH SENSITIVE WIRELESS DEVICE AND ON SCREEN DISPLAY FOR REMOTELY CONTROLLING A SYSTEM, which claims priority from U.S. Provisional Patent Application No. 61/094,099, of David McKinley et al., filed on Sep. 4, 2008, entitled TOUCH-SENSITIVE WIRELESS DEVICE AND ON SCREEN DISPLAY FOR REMOTELY CONTROLLING A SYSTEM, both of which are incorporated herein by reference.

This application is related to the following copending United States patent applications: SYSTEM AND METHOD FOR A PROGRAMMABLE MULTIMEDIA CONTROLLER, filed Dec. 20, 2005 and assigned Ser. No. 11/314,664, PROGRAMMABLE MULTIMEDIA CONTROLLER WITH PROGRAMMABLE SERVICES, filed Dec. 20, 2005 and assigned Ser. No. 11/314,112, PROGRAMMING ENVIRONMENT AND METADATA MANAGEMENT FOR PROGRAMMABLE MULTIMEDIA CONTROLLER, filed Sep. 13, 2006 and assigned Ser. No. 11/520,215, and PROGRAMMABLE ON SCREEN DISPLAY AND REMOTE CONTROL, filed Mar. 16, 2007 and assigned Ser. No. 11/687,458, all of which are assigned to a common assignee and all of which are expressly incorporated herein by reference.

BACKGROUND OF THE INVENTION

1. Field of the Invention

The present invention relates generally to a touch-sensitive wireless device though which a user, in combination with an on screen display, may remotely control a programmable multimedia controller or other system.

2. Background Information

A now decades long expansion in the number and types of consumer electronic devices has generated pervasive use of radiofrequency (RF) and infrared (IR) remote controls. Originally developed for television, remote controls now accompany essentially every CD player, DVD player, audio receiver, TV, home theatre, camcorder and portable radio. To simply play a DVD and watch a movie on a TV, it may be necessary to operate three different remote controls in order to turn on and properly set the TV, DVD player and home theatre system for the performance.

One conventional approach to eliminating or reducing the number of physical remote controls is the so-called universal remote control. In general, a universal remote control works by "learning" the RF or IR signals to which various devices respond. Once the signals are learned and retained in memory, the universal remote control may control multiple devices.

Universal remote controls, however, present certain disadvantages beginning with a dizzying array of physical buttons, perhaps dozens, which are often marked with arcane, difficult to read labels. Due to the number of buttons, they are often so small they are difficult and annoying to use. Further, the physical layout of the buttons does not conform to any industry standard nor to an arrangement that most users find intuitive or even familiar. In addition, because of the small button size and counterintuitive layout, most users cannot operate a universal remote control by touch in a "heads up" manner but must instead frequently look down at the buttons to ensure the correct one is pressed. This represents a recurring, frustrating distraction for many users. Lastly, a conventional universal remote control has no capability to change its functionality based on different users' preferences, handicaps or other factors.

SUMMARY OF THE INVENTION

In brief summary, one aspect of the invention enables a touch-sensitive wireless device, such as a wireless telephone or wireless multimedia player, in conjunction with an interactive on screen display, to effectively remotely control a programmable multimedia controller or other system. User gestures, button presses or other touches to or movements of the touch-sensitive wireless device cause information to be wirelessly communicated to the programmable multimedia controller. Once received by the programmable multimedia controller, such information is effectively converted or translated into one or more commands or messages which are understandable by the controller's operating software.

Based upon programmable services supported by the programmable multimedia controller, a given command or message may cause changes to the interactive on screen display such as causing icons to rotate in one direction or another. Alternatively, a given command or message may cause changes in the operational state of the programmable multimedia controller such as powering the controller up or down. Similarly, a given command or message may cause changes with respect to a programmable services supported by the controller such as a DVD to begin playing.

Through a graphical programming environment, the function or functions associated with each icon or button in the interactive on screen display may be easily assigned or modified. An assigned function may be dynamically changed to provide appropriate functionality for the particular programmable service that a user has selected. Similarly, an assigned function may be dynamically changed in response to a menu level or state to which a user has navigated within a particular on screen display or programmable service.

The invention provides numerous advantages. First, a single wireless device, such as a touch-sensitive wireless telephone or touch-sensitive wireless multimedia player, may be used to remotely control a complex system which includes a large number of audio, video or other components.

Second, touch-sensitive wireless devices such as telephones or multimedia players are small and light and users are comfortable carrying them on an everyday basis. To the extent that the touch-sensitive wireless device is one that a user is inclined to carry anyway, the invention enables a user to leverage his or her investment and obtain significant additional functionality from that device.

Third, the user enjoys great convenience by avoiding the use of multiple remote control devices which are frequently lost or misplaced. A user need only keep track of a single wireless device. Further, through functionality provided by the programmable multimedia controller, the user's wireless device becomes aware of a plurality of on screen displays which may be present in different rooms of a house or zones of a system.

BRIEF DESCRIPTION OF THE DRAWINGS

The invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
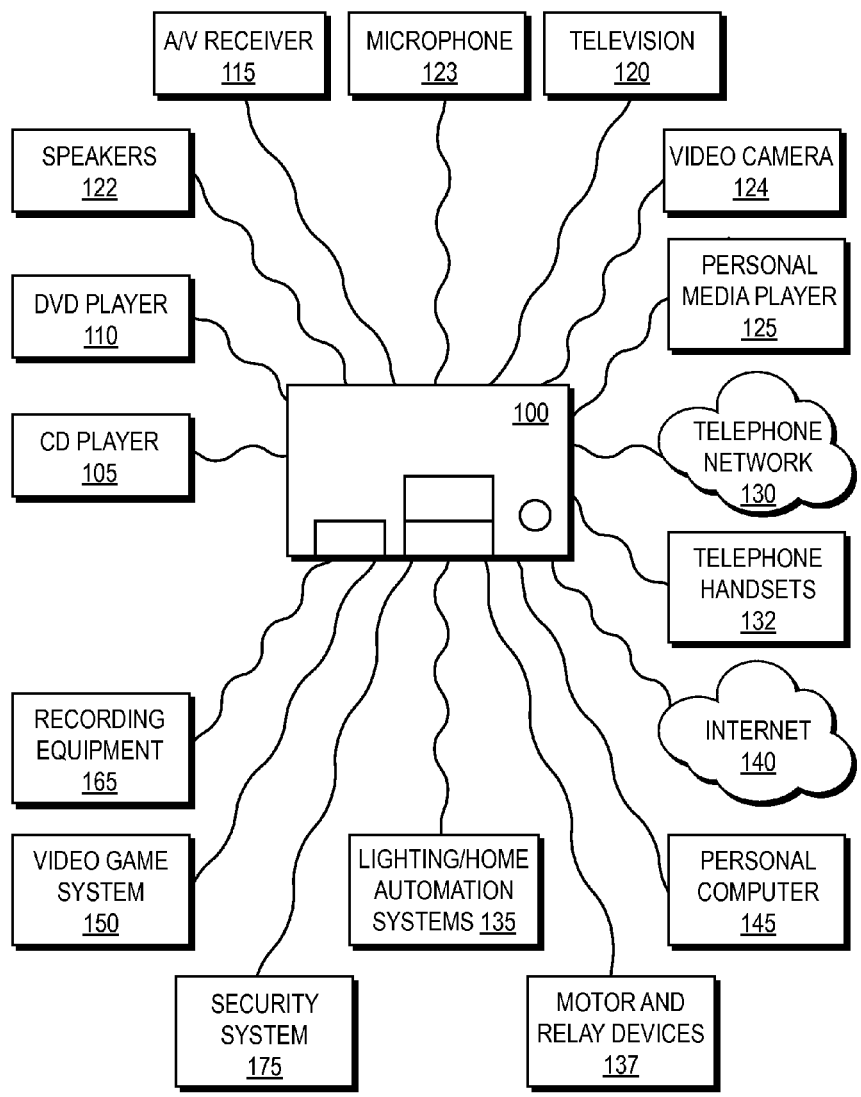
FIG. 1 is a block diagram of a programmable multimedia controller.

FIG. 1 is a block diagram of a programmable multimedia controller 100, interconnected to a number of devices, according to an illustrative embodiment of the present invention. The term "programmable multimedia controller" should be interpreted broadly as a device capable of controlling, switching data between, and/or interoperating with a variety of electronic devices, such as audio, video, telephony, data, security, motor-driven, relay-driven, and/or other types of electronic devices. By interacting with these devices, the programmable multimedia controller may implement an integrated multimedia control solution.

In the illustrative embodiment, the programmable multimedia controller 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The programmable multimedia controller may also be connected to telephony devices such as a telephone network 130 and telephone handsets 132. The telephone network 130 may be a publicly switched telephone network (PSTN), a private network or other network.

In addition, the programmable multimedia controller may intercommunicate with variety of light and/or home automation systems 135. These devices may operate via the X10 protocol developed by Pico Electronics, the INSTEON™ protocol developed by SmartHome, Inc, the CEBus standard managed by the CEBus Industry Council, or another well known home automation or control protocol. Similarly the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected.

In addition to providing interconnection to a wide variety of devices, the programmable multimedia controller is able to combine, synthesize, and otherwise processes various data types to implement an integrated multimedia solution for a user. In a preferred embodiment, the programmable multimedia controller 100 includes a general purpose computer such as a MacPro sold by Apple Inc. Further details regarding the internal architecture of programmable multimedia controller 100 are set forth in the co-pending application entitled SYSTEM AND METHOD FOR A PROGRAMMABLE MULTIMEDIA CONTROLLER referenced above.

To facilitate the above described interconnections and processing, the programmable multimedia controller 100 may be arranged in a modular manner. For example, in one embodiment, the programmable multimedia controller 100 is arranged to have twelve separate input and output modules, each having a number of connection ports. The input and output modules are inserted into slots or module bays of the programmable multimedia controller 100. The modules interface with a mid-plane that provides connection to the rest of the system. By embracing a modular approach, a user is allowed to select the specific modules desired, and the system may be customized to fit a particular application. In addition, entry level pricing may be reduced by allowing a user to purchase a base configuration, with limited capabilities, and then add to the system by purchasing addition modules. It is expressly contemplated that a wide variety of additional modules may be provided, and, accordingly, this disclosure should be interpreted to embrace such other possible configurations. It is also contemplated that several programmable multimedia controllers may be interconnected to create a larger system, in effect implementing a modular-type solution at the controller level.

Figure 2:
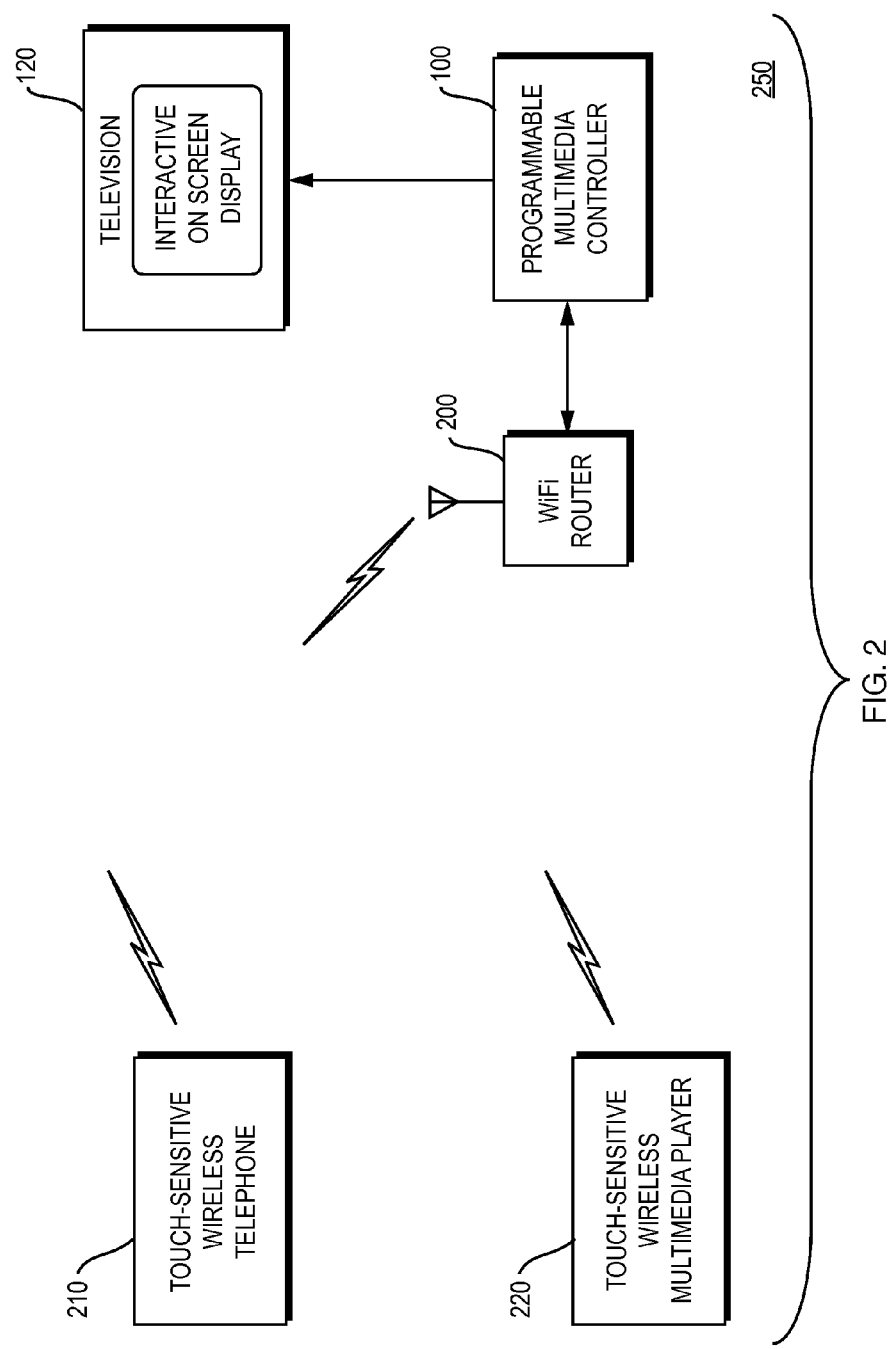
FIG. 2 is a block diagram of programmable multimedia controller which is remotely controlled by a touch-sensitive wireless device, in conjunction with an interactive on screen display, in accordance with an illustrative embodiment of the invention.

FIG. 2 shows a system 250 which includes a programmable multimedia controller 100, a television (or other video display) 120 on which an interactive on screen display appears and a WiFi router 200. For purposes of enhanced clarity, other components like those shown in FIG. 1, which may be interconnected with controller 100, are omitted. A touch-sensitive wireless telephone 210, which may be implemented with an iPhone sold by Apple Inc., is capable of wirelessly communicating with programmable multimedia controller 100 through WiFi router 200. A touch-sensitive wireless multimedia player 220, which may be implemented with an iTouch sold by Apple Inc., is similarly capable of wireless communication with programmable multimedia controller 100. As described in detail below, either touch-sensitive wireless telephone 210 or touch-sensitive multimedia player 220, in conjunction with the interactive on screen display, may be used by a user to control the operation of programmable multimedia controller 100.

Figure 3:
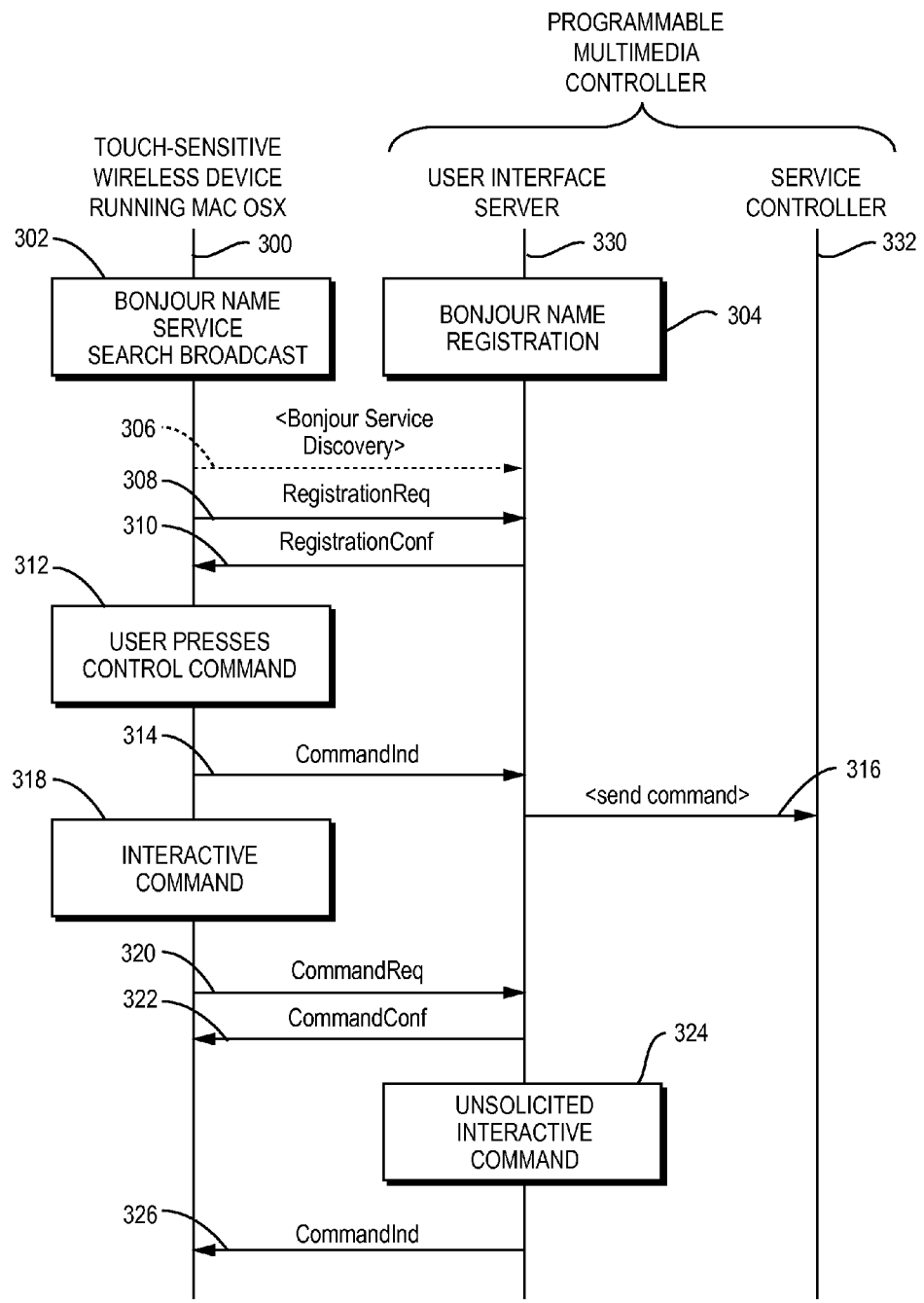
FIG. 3 is a message flow diagram illustrating how touch-sensitive wireless devices such as those shown in FIG. 2 may discover and establish wireless communication with a programmable multimedia controller.

In order to establish wireless communications with programmable multimedia controller 100, touch-sensitive wireless devices 210 and 220 may utilize a service discovery protocol such as Bonjour by Apple Inc. Other wireless communication protocols may also be used. As shown in FIG. 3, a touch-sensitive wireless device running Mac OS X 300, which may represent either of devices 210 and 220, initially attempts to autodetect a server (i.e., user interface server 330 running on programmable multimedia controller 100) by way of the Bonjour Name Service (wireless) search broadcast 302 which is part of OS X. User interface server 330 includes Bonjour Name Registration 304. A Bonjour Service Discovery message 306 is issued by wireless device 300 and received by user interface server 330. This is followed by a registration request 308 which is processed by Bonjour Name Registration 304 and acknowledged by way of registration confirmation message 310.

Once wireless device 300 is registered, subsequently, a user may make a gesture, press a button, touch or simply move wireless device 300. As a result, a command indication 314 is issued to user interface server 330. User interface server 330 recognizes command indication 314 as a control command or request and responds by issuing a send command message 316 to service controller 332 which reacts according to the functionality previously programmed into programmable multimedia controller 100. Details regarding the services and functionality which may be programmed into controller 100 are set forth in the co-pending application entitled PROGRAMMABLE MULTIMEDIA CONTROLLER WITH PROGRAMMABLE SERVICES referenced above.

In the case of an interactive command 318 which requires data from user interface server 330, a command request 320 is issued by device 300 to user interface server 330. User interface server 330 replies with a command confirmation 322 which returns the requested data to wireless device 300.

In the case of an unsolicited interactive command 324 (e.g., a user loads a DVD into a DVD player or disconnects a component), user interface server 330 may issue a command indication 326 to inform wireless device 300 of the event.

Figure 4:
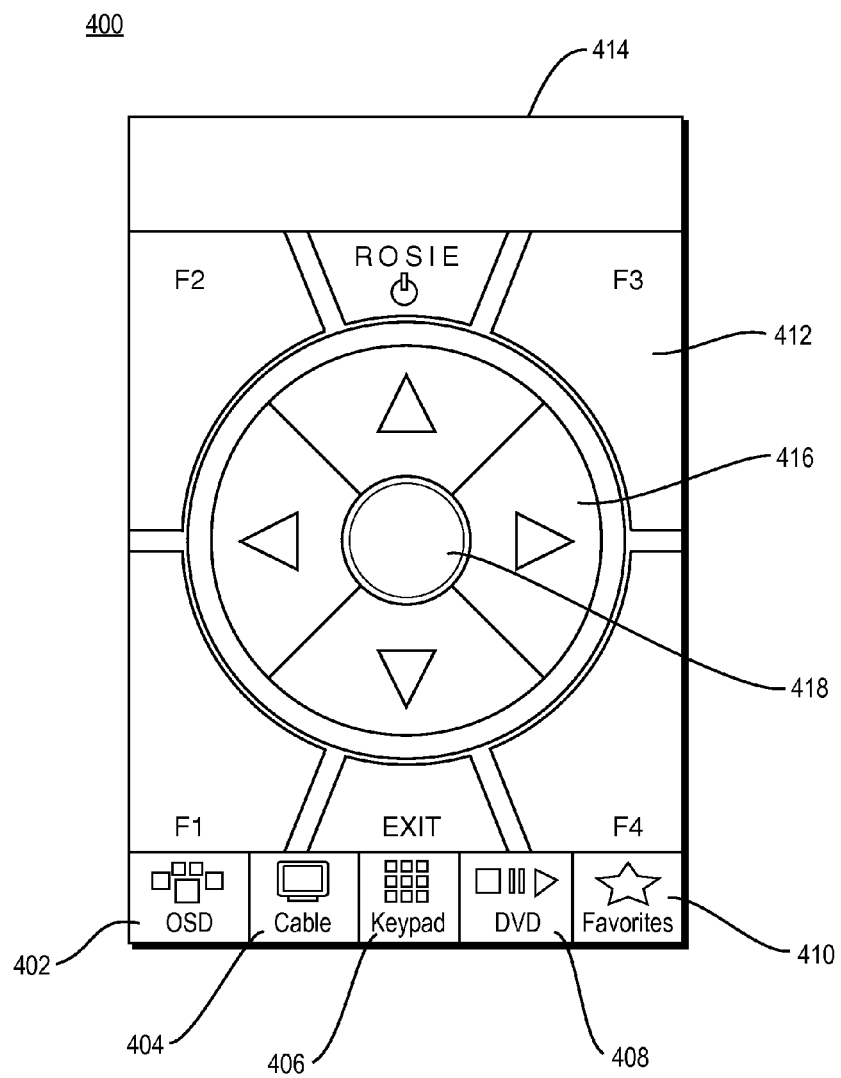
FIG. 4 is a screenshot of a touch-sensitive wireless device such as those shown in FIG. 2.

FIG. 4 shows a screenshot or representation 400 which may, in a preferred embodiment, be displayed on the touch-sensitive display of either of the wireless devices 210 and 220 shown in FIG. 2. A graphical button 414, when pressed by a user, causes programmable multimedia controller 100 to power up or down. A group of outer graphical buttons 412, labeled F1, F2, F3 and F4, have corresponding functions which may be dynamically assigned and changed as discussed in detail in a co-pending application entitled PROGRAMMABLE ON SCREEN DISPLAY AND REMOTE CONTROL referenced above. Similarly, a group of inner graphical buttons 416, which are labeled with directional arrows, have corresponding functions which may be dynamically assigned and changed.

A row of special graphical buttons is arranged along the bottom edge of screenshot 400. An OSD button 402, when pressed by a user, causes an interactive on screen display to appear on television 120. Similarly, cable button 404, keypad button 406, DVD button 408 and favorites button 410 allow a user fast, direct access to several of the most frequently used functions (e.g., controlling a cable TV converter box).

Figure 5:
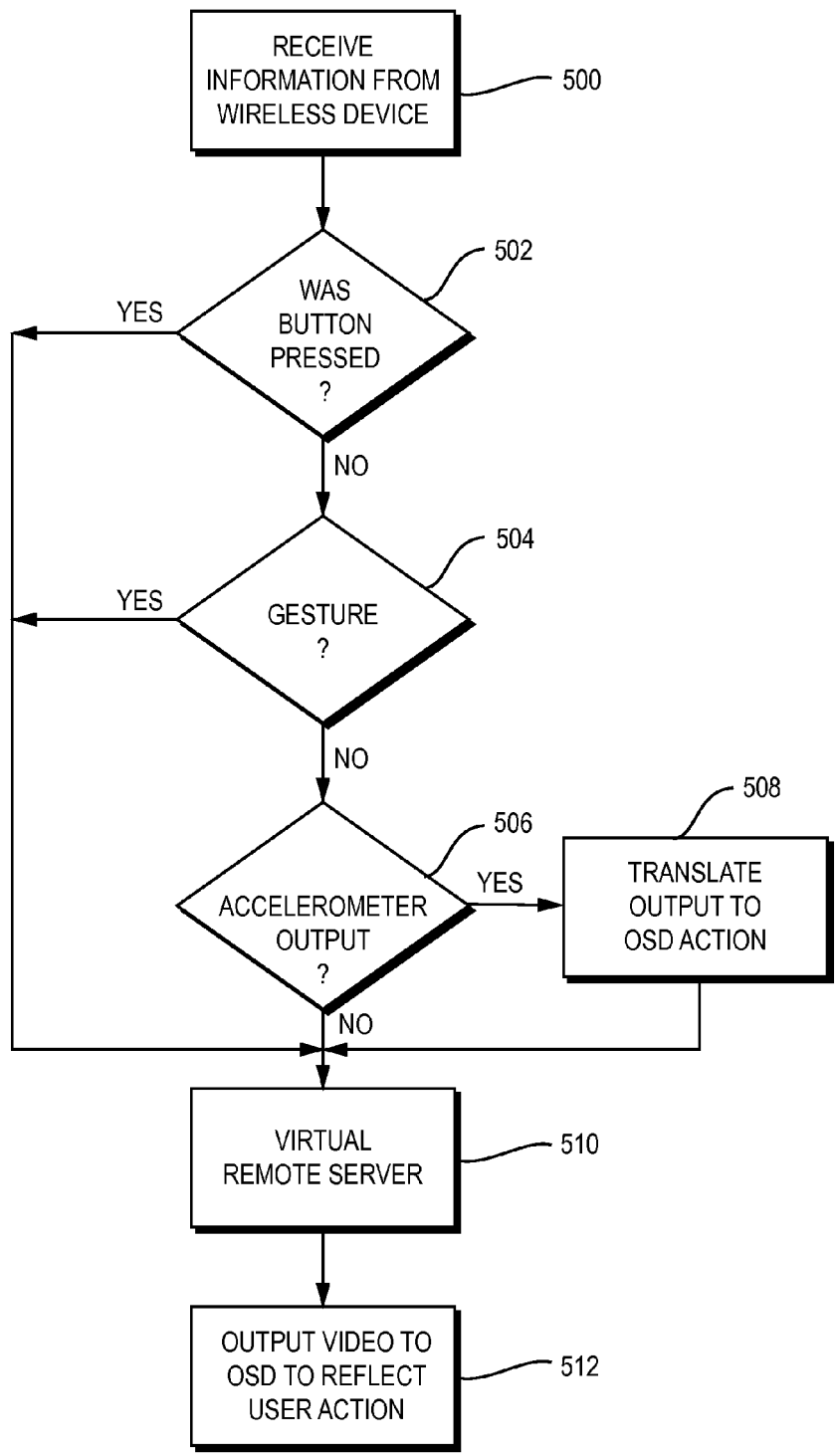
FIG. 5 is a flowchart illustrating how information received from wireless devices is processed to effect desired user control of the programmable multimedia controller.

FIG. 5 is a flowchart which illustrates how information from wireless devices 210 and 220 (FIG. 2) is processed to provide effective user control. The steps shown in FIG. 5 are, in a preferred embodiment, implemented or performed by a combination of hardware, firmware or software found in programmable multimedia controller 100.

At step 500, information is received, via WiFi router 200, from one of wireless devices 210 or 220. At step 502, a determination is made whether the received information signifies that a user pressed a button on wireless device 210 or 220. If so, the process advances to step 510, which is discussed below. If not, the process advances to step 504 where a determination is made whether the received information signifies that a user made a gesture (e.g., finger swipe) on wireless device 210 or 220. If so, the process advances to step 510 and, if not, the process advances to step 506.

At step 506, a determination is made whether the received information signifies that an accelerometer located within wireless device 210 or 220 has generated an output signifying movement of the wireless device. If so, the process advances to step 508 where the movement detected by the accelerometer is translated or mapped to a corresponding change or action with respect to an interactive on screen display. For example, a user holding wireless device 210 or 220 may press and hold center button 418 (FIG. 4) and then tilt the wireless device in a certain direction. At step 508, this tilting may be translated or mapped so as to cause icons displayed in the interactive on screen display to rotate in a particular direction. Conversely, tilting the wireless device 210 or 220 in the opposite direction may cause icons to rotate in the opposite direction.

At step 510, information received from wireless devices 210 and 220, as well as translation or mapping information received from step 508, are processed by a virtual remote server. In general, the virtual remote server processes received information, corresponding to user action on wireless device 210 or 220, and determines what changes to the interactive on screen display (FIG. 2) should be made to reflect such user action. For example, if the user pressed DVD button 408 (FIG. 4), the virtual remote server would process that information and determine that the video output signal from programmable multimedia controller 100 (FIG. 2) to television 120 should be changed so as to show an on screen display of DVD player controls such as play, pause, stop and the like. Thus, at step 512, appropriate changes to the output video signal are made and the user sees the results on television 120.

Figure 6:
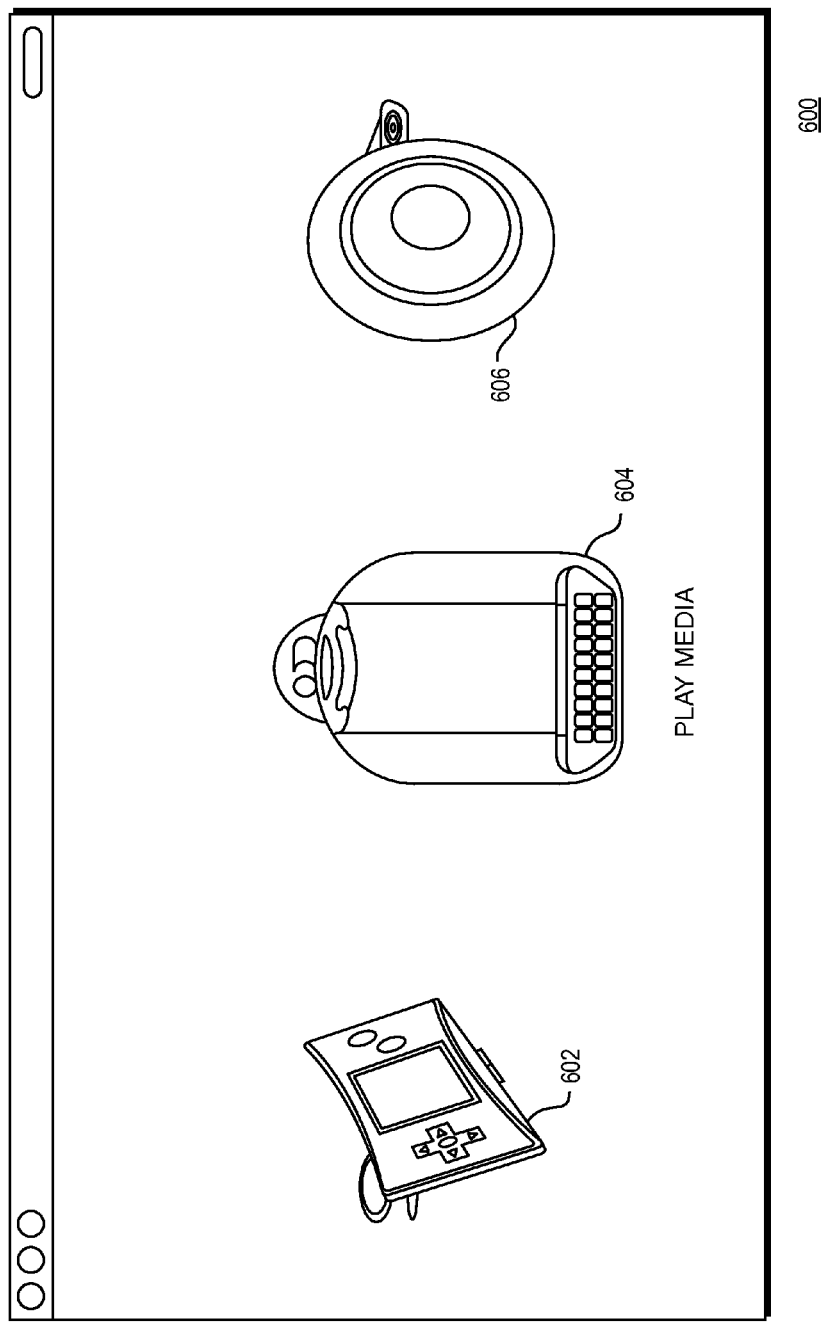
FIG. 6 is a screenshot of an interactive on screen display in which a rotating selection of icons representing different programmable services are presented to a user who may use a touch-sensitive wireless device to rotate and select the icons in accordance with an illustrative embodiment of the invention.

FIG. 6 shows an example of an interactive on screen display 600 in which a rotating selection of icons are presented to a user (not shown). For purposes of enhanced clarity, video images, graphics and other content are omitted from interactive on screen display 600, but it should be understood that such content may be displayed on the screen along with the icons, buttons or other elements.

In accordance with a typical programmable service that may be provided by the system of FIGS. 1 and 2, an icon 604, which has the appearance of an old-fashioned diner music selector, will (when selected by a user) cause the programmable multimedia controller 100 to initiate a "Play Media" service. Such a service would typically allow a user to play desired CDs, DVDs, MP3 files or other media.

Icon 606, which has the appearance of a thermostat, will when selected cause the multimedia controller 100 to initiate an "HVAC" service through which room temperature may be controlled.

Icon 602, which has the appearance of a video game controller, will when selected cause the programmable multimedia controller 100 to initiate a video game service.

In a preferred embodiment, icons 602-606, as well as others that may be present, may be rotated in either of two directions in response to a user action. When a user wishes to select one of the icons 602-606, he or she simply rotates the icons until the desired one appears in the front and center position (e.g., icon 604) in on screen display 600. At that point, the user may select the icon by pressing, for example, center button 418 (FIG. 4) or another appropriate button displayed on the touch-sensitive display of wireless devices 210 and 220.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A multimedia system capable of being remotely controlled by a wireless telephone comprising:
   a programmable multimedia controller which includes a general purpose computer and at least one video output module, said programmable multimedia controller coupled to a plurality of devices, including one or more lighting devices, automatic shade or blind devices, heating ventilation and air conditioning (HVAC) devices or security devices;
   at least one television coupled to said at least one video output module, responsive to said programmable multimedia controller for showing a plurality of interactive on screen displays, at least one of said interactive on screen displays including a plurality of icons that are each at a respective position within a menu structure and that are movable within said menu structure, and selectable by a user to control one or more programmable services supported by said programmable multimedia controller;
   a wireless telephone separate from said at least one television and said programmable multimedia controller, said wireless telephone including an accelerometer and a touch-sensitive display operable by a user to interact with said interactive on screen displays shown on said at least one television; and
   a virtual remote server configured to receive information from said wireless telephone indicating said accelerometer of said wireless telephone has generated an output signifying movement of said wireless telephone and to map said movement to a corresponding rotation of said plurality of icons among said positions in said menu structure in said interactive on screen display currently being shown on said at least one television separate from said wireless telephone such that in response to said movement a first icon that was initially at a particular position in said menu structure is no longer disposed at said particular position, and a second icon that was initially not at said particular position is disposed at said particular position, and to receive information from said wireless telephone indicating a user action signifying a selection has been detected by said touch sensitive display of said wireless telephone, and to map said user action signifying a selection to selection of said second icon at said particular position in said menu structure, wherein selection of at least one icon causes said programmable multimedia controller to issue one or more commands to said one or more lighting devices, automatic shade or blind devices, HVAC devices or security devices for controlling a given one of said one or more programmable services.

2. The multimedia system as in claim 1 wherein one or more of said plurality of interactive on screen displays includes one or more icons whose assigned functionality dynamically changes depending upon which one of said one or more programmable services said user is controlling.

3. The multimedia system as in claim 1 wherein one or more of said plurality of interactive on screen displays includes one or more icons whose assigned functionality dynamically changes depending upon a menu level to which said user has navigated.

4. The multimedia system as in claim 1 wherein said wireless telephone is configured to wirelessly transmit said information indicating said accelerometer has generated an output signifying movement and said selection has been detected by said touch sensitive display to said programmable multimedia controller.

5. The multimedia system as in claim 1 wherein said touch-sensitive display is configured to display one or more buttons each of which enables said user to gain access to a predetermined one of said programmable services.

6. A multimedia system capable of being remotely controlled by a wireless multimedia player comprising:
   a programmable multimedia controller including a general purpose computer and at least one video output module, said programmable multimedia controller coupled to a plurality of devices, including one or more lighting devices, automatic shade or blind devices, heating ventilation and air conditioning (HVAC) devices or security devices;
   at least one television coupled to said at least one video output module, responsive to said programmable multimedia controller for showing a plurality of interactive on screen displays, at least one of said interactive on screen displays including a plurality of icons that are each at a respective position within a menu structure and that are movable within said menu structure and selectable by a user to control one or more programmable services supported by said programmable multimedia controller;
   a wireless multimedia player separate from said at least one television and said programmable multimedia controller, said wireless multimedia player including an accelerometer and a touch-sensitive display operable by a user to interact with said interactive on screen displays shown on said at least one television; and
   a virtual remote server configured to receive information from said wireless multimedia player indicating said accelerometer of said wireless multimedia player has generated an output signifying movement of said wireless multimedia player and to map said movement to a corresponding rotation of said plurality of icons among said positions in said menu structure in said interactive on screen display currently being shown on said at least one television separate from said wireless multimedia player, and to receive information from said wireless multimedia player indicating a user action signifying a selection has been detected by said touch sensitive display of said wireless multimedia player, and to map said user action signifying a selection to selection of an icon at a particular position in said interactive on screen display, wherein selection of said icon at said particular position causes said programmable multimedia controller to issue one or more commands to said one or more lighting devices, automatic shade or blind devices, HVAC devices or security devices for controlling a given one of said one or more programmable services.

7. The multimedia system as in claim 6 wherein one or more of said plurality of interactive on screen displays includes one or more icons whose assigned functionality dynamically changes depending upon which one of said one or more programmable services said user is controlling.

8. The multimedia system as in claim 6 wherein one or more of said plurality of interactive on screen displays includes one or more icons whose assigned functionality dynamically changes depending upon a menu level to which said user has navigated.

9. The multimedia system as in claim 6 wherein said wireless multimedia player is configured to, wirelessly transmit said information indicating said accelerometer has generated an output signifying movement and said selection has been detected by said touch sensitive display to said programmable multimedia controller.

10. The multimedia system as in claim 6 wherein said touch-sensitive display is configured to display one or more buttons each of which enables said user to gain access to a predetermined one of said programmable services.

11. A method for remotely controlling a multimedia system using a wireless device comprising the steps of:
coupling at least one television to a programmable multimedia controller which controls audio/video (A/V) devices and at least lighting devices, automatic shade or blind devices, heating ventilation and air conditioning (HVAC) devices or security devices, to provide a plurality of programmable services;
registering the wireless device separate from said at least one television and said programmable multimedia controller with a server associated with the programmable multimedia controller;
showing a plurality of interactive on screen displays on said at least one television, at least one of said interactive on screen displays including a plurality of icons that are each at a respective position within a menu structure and that are rotatable among said positions within said menu structure, and that are selectable by a user, at least one icon selectable to control one or more of said lighting devices, automatic shade or blind devices, HVAC devices or security devices to provide to provide a programmable service;
detecting movement of said wireless device and a user action signifying a selection on said wireless device, said wireless device configured to communicate with said programmable multimedia controller and including an accelerometer for detecting said movement and a touch-sensitive display for detecting said selection, said wireless device being a wireless telephone or a wireless multimedia player;
receiving information at said programmable multimedia controller from said wireless device indicating said movement and said selection; and
mapping, by said programmable multimedia controller, said movement to a corresponding rotation of said plurality of icons among said positions in said menu structure an interactive on screen display currently being shown on said at least one television separate from said wireless device, such that in response to said movement a first icon that was initially at a center position is no longer disposed at said center position in said menu structure, and a second icon that was initially not at said center position is disposed at said center position in said menu structure, and mapping said selection to selection of an icon at said particular position in said menu structure.

12. The method as in claim 11 wherein one or more of said plurality of interactive on screen displays includes one or more icons whose assigned functionality dynamically changes depending upon which one of said plurality of programmable services said user is controlling.

13. The method as in claim 11 wherein one or more of said plurality of interactive on screen displays includes one or more icons whose assigned functionality dynamically changes depending upon a menu level to which said user has navigated.

14. The method as in claim 11 wherein said wireless device wirelessly transmits said information indicating said accelerometer has generated an output signifying movement and said selection has been detected by said touch sensitive display to said programmable multimedia controller.

15. The method as in claim 11 wherein said touch-sensitive display displays one or more buttons each of which enables said user to gain access to a predetermined one of said programmable services.

16. The method as in claim 11 wherein said wireless device is a wireless telephone.

17. The method as in claim 11 wherein said wireless device is a wireless multimedia player.

18. The method as in claim 14, wherein said programmable multimedia controller receives a command indication message and recognizes it as a control command or request and responds by issuing a send command message.

19. The method as in claim 18 further comprising:
upon receiving an interactive command at said wireless device, issuing a command request to the programmable multimedia controller, which in turn replies with a command confirmation returning data to the wireless device.

20. The method as in claim 14 wherein said information indicating said selection has been detected by said touch sensitive display describes that the user has pressed a button or made a gesture on said touch sensitive display.

21. A method for remotely controlling a multimedia system using a wireless telephone comprising the steps of:
registering said wireless telephone with a server associated with the programmable multimedia controller of said multimedia system, said programmable multimedia controller configured to control audio/video (A/V) devices and at least lighting devices, automatic shade or blind devices, heating ventilation and air conditioning (HVAC) devices or security devices of said multimedia system;
showing an interactive on screen display on a television coupled to said programmable multimedia controller, said interactive on screen display including a plurality of icons that are each at a respective position within a menu structure and that are movable among the positions within said menu structure, and are selectable by a user;
detecting a movement of a wireless telephone separate from said at least one television and said programmable multimedia controller, said movement detected by an accelerometer of said wireless telephone;
mapping said movement to a corresponding movement of said plurality of icons among positions in said interactive on screen display shown on said television, such that in response to said movement a first icon that was initially at a center position is no longer disposed at said center position in said menu structure, and a second icon that was initially not at said center position is disposed at said center position in said menu structure;
detecting a user action signifying a selection on a touch sensitive display of said wireless telephone; and
mapping said user action signifying a selection on said touch sensitive display of said wireless telephone to selection of said second icon at said center position in said menu structure, wherein selection of said second icon causes said programmable multimedia controller to issue one or more commands for controlling one or more of said lighting devices, automatic shade or blind devices, HVAC devices or security devices of said multimedia system.

22. The method of claim 21, further comprising:
receiving information from said wireless telephone indicating said movement detected by said accelerometer of said wireless telephone at said programmable multimedia controller by way of a WIFI network; and receiving information from said wireless telephone indicating said user action signifying said selection on said touch sensitive display of said wireless telephone at said programmable multimedia controller by way of said WIFI network.

\* \* \* \* \*